United States Patent
Rastegar et al.

(10) Patent No.: US 9,310,262 B2
(45) Date of Patent: Apr. 12, 2016

(54) METHOD AND APPARATUS FOR CONFIRMING WHETHER A FROZEN FOOD HAS BEEN DEFROSTED

(71) Applicants: Jahangir S Rastegar, Stony Brook, NY (US); Thomas Spinelli, Northport, NY (US)

(72) Inventors: Jahangir S Rastegar, Stony Brook, NY (US); Thomas Spinelli, Northport, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 360 days.

(21) Appl. No.: 13/674,075

(22) Filed: Nov. 11, 2012

(65) Prior Publication Data

US 2014/0130729 A1  May 15, 2014

(51) Int. Cl.
*G01K 11/06* (2006.01)
*G01K 11/00* (2006.01)
*G01K 11/12* (2006.01)

(52) U.S. Cl.
CPC ............... *G01K 11/06* (2013.01); *G01K 11/12* (2013.01); *G01K 2207/04* (2013.01)

(58) Field of Classification Search
CPC .......... G01K 5/32; G01K 5/48; G01K 5/483; G01K 5/50; G01K 5/56; G01K 11/00; G01K 11/003; G01K 11/06; G01K 11/12
USPC .......... 116/216, 217, 218, 219, 221; 374/100, 374/105, 106, 159, 160, 161, 162, 187, 195, 374/201, 205
See application file for complete search history.

(56) References Cited

U.S. PATENT DOCUMENTS

| | | | | |
|---|---|---|---|---|
| 3,233,459 A * | 2/1966 | Loomis et al. | ................ | 374/106 |
| 3,242,733 A * | 3/1966 | Johnson | ........................ | 374/102 |
| 4,038,936 A * | 8/1977 | Kessler | ........................ | 116/219 |
| 4,120,818 A * | 10/1978 | Swindells et al. | ............ | 116/207 |
| 4,457,253 A * | 7/1984 | Manske | ........................ | 116/216 |
| 5,111,768 A * | 5/1992 | Larsson et al. | ................ | 116/216 |
| 5,215,378 A * | 6/1993 | Manske | ........................ | 374/105 |
| 6,042,264 A * | 3/2000 | Prusik et al. | ................... | 374/106 |
| 6,843,199 B2 * | 1/2005 | Abe et al. | ........................ | 116/106 |
| 6,916,116 B2 * | 7/2005 | Diekmann et al. | ............ | 374/102 |
| 7,011,037 B2 * | 3/2006 | Cooperman | ................... | 116/216 |
| 7,415,939 B2 * | 8/2008 | Dip | ................................ | 116/216 |
| 7,490,575 B2 * | 2/2009 | Taylor et al. | ................... | 116/216 |
| 7,571,695 B2 * | 8/2009 | Taylor et al. | ................... | 116/216 |
| 7,600,912 B2 * | 10/2009 | Leute et al. | .................... | 374/157 |
| 7,984,687 B2 * | 7/2011 | Suda | ............................. | 116/219 |
| 8,439,563 B1 * | 5/2013 | Alqaffas | ........................ | 374/201 |
| 8,695,528 B2 * | 4/2014 | Boyaci et al. | ................. | 116/216 |
| 2003/0123519 A1 * | 7/2003 | Bachrach | ........................ | 374/159 |
| 2009/0200160 A1 * | 8/2009 | Abe et al. | ................. | 204/196.02 |

FOREIGN PATENT DOCUMENTS

| | | | | |
|---|---|---|---|---|
| FR | 2621688 A1 * | 4/1989 | ............. | G01K 11/12 |
| GB | 2130720 A * | 6/1984 | ............. | G01K 11/06 |
| JP | 2002022550 A * | 1/2002 | ............. | G01K 5/32 |
| JP | 2002350243 A * | 12/2002 | ............. | G01K 11/00 |
| JP | 2002350245 A * | 12/2002 | ............. | G01K 11/06 |
| JP | 2002350246 A * | 12/2002 | ............. | G01K 11/06 |
| JP | 2007085849 A * | 4/2007 | ............. | G01K 11/06 |
| JP | 2011214875 A * | 10/2011 | ............. | G01K 11/12 |

* cited by examiner

*Primary Examiner* — R. A. Smith

(57) ABSTRACT

A defrost indicator including: a body member defining a cavity;
two or more fluids, each having one or more of a different composition or characteristic; and wherein when the two or more fluids are exposed to a predetermined temperature, the two or more fluids mix or interact to produce a different composition or characteristic.

2 Claims, 10 Drawing Sheets

METHOD AND APPARATUS FOR CONFIRMING WHETHER A FROZEN FOOD HAS BEEN DEFROSTED

BACKGROUND

1. Field

The present disclosure relates generally to sensors used to indicate if a packaged material has been previously heated to above certain temperature level, and in particular to sensors that can be placed in or on packaged food that are supposed to be kept below certain temperature, such as below freezing point, to indicate if the packaged food has been previously heated above a certain temperature level, for example, whether it has been wholly or partially defrosted in storage or during transportation.

2. Prior Art

In the food industry in particular, many foods are preserved in frozen form to keep them fresh. In such cases, foods of various sorts are frozen soon after appropriate preparations, and are supposed to be kept frozen until shortly prior to use. In general, the frozen material is required to be kept frozen to prevent spoilage. In certain cases, for example for the case of fish, the fish is frozen soon after catching (with or without any processing) and are to be kept frozen until obtained by a user, such as a food processor or a final user (consumer), otherwise its value is significantly reduced and in certain cases may even have to be discarded.

In many cases, the frozen food is transported over long distances and stays stored for some length of time before it reaches the final user. At that point, a processor or the final user is eager to know if the frozen food has ever been defrosted since its initial freezing. The frozen food is usually packaged in sealed plastic bags for low cost and to prevent contamination and are marked and sometimes dated so that the user can become aware of the content without requiring opening the packaging.

It is therefore highly desirable to determine if the packaged and sealed frozen food has ever been defrosted since its initial freezing. Hereinafter, by the term "defrosting" it is intended to indicate the rise in temperature above some predetermined temperature that may cause an undesirable state for the food, such as a decrease in quality or spoilage. For example, defrosting would indicate the temperature rising above 32 degrees F. (0 degree C.), i.e., the melting point of ice. However, for frozen food, it may also indicate a temperature rise above a point at which the frozen food is desired to be kept, e.g., 10 degrees F. (around −12 degrees C.). Hereinafter, such devices will be generally referred to as "defrost indicator" even though they may indicate the food being subjected to undesirable temperatures other than that at which the frozen food begins to defrost.

As discussed above, the aforementioned "freezing temperature" may also be used to indicate almost any temperature below which the packaged food or other material is desired to be kept. For example, certain fish, eggs or vegetables may be desired to be kept below 5 or 10 degrees C. The present "defrost indicators" are therefore meant to indicate any desired temperature below which the packaged material is desired to be kept and not solely the actual freezing temperature of the packaged material.

In the following descriptions of the various embodiments, the "defrost indicator" is considered to be placed inside (or on) a packaged frozen food (e.g., under a transparent portion of the packaging—for example clear plastic sheeting) or its container so that the user can observe the state of the packaged food, e.g., whether it has been defrosted after initial freezing. It is, however, appreciated by those skilled in the art that such "defrost indicators" may also be placed within the food and otherwise not observable from the outside of the packaging. In such cases, the final user has to open the package to expose the defrost indicator to determine if the food has been defrosted after its initial freezing. In addition, such defrost indicators may also be placed in bulk storage bins or the like for the same defrost indication purposes. In all such applications, those embodiments that allow certain amount of higher temperature exposure before indicating past defrosting are preferably used so that false defrost indication is avoided.

Numerous devices exist for measuring the temperature in general and the temperature of packaged material of different types. Numerous mercury type and battery operated thermometers (the so-called "high/low thermometers") are also available that can display or record the highest and the lowest temperatures that they have been exposed to over any length of time. Such high/low thermometers are, however, not practical for packaged frozen food due to their cost, size, survival during handling, and for the case of battery operated devices the existence of a battery itself as a hazardous material and the fact that the battery has to power the device over very long periods of time and in extreme environments.

SUMMARY

It is therefore highly desirable to provide packaged frozen food with very simple devices for indicating whether it has ever been defrosted or subjected to any other undesirable temperature (both of which are referred to herein as being defrosted) after its initial freezing. To make the use of such means practical, they should be very low cost, very difficult to tamper with, and easy to deploy in packaged food during the packaging process.

With such devices, a user of the frozen food, including the final user of the frozen food can readily determine if the food has even been defrosted during transportation, storage, etc., following initial freezing, thereby be guaranteed freshness and/or avoid the possibility of spoilage.

Accordingly, a defrost indicator is provided. The defrost indicator comprising: a body member defining a cavity; two or more fluids, each having one or more of a different composition or characteristic; and wherein when the two or more fluids are exposed to a predetermined temperature, the two or more fluids mix or interact to produce a different composition or characteristic.

The two or more fluids can be two or more liquids. The defrost indicator can further comprise an absorbing material disposed in the interior cavity to facilitate the mixing or interacting of the two or more liquids.

The two or more fluids can be at least one frozen liquid separating at least two gases. The body member can further comprise a vent hole corresponding to the frozen liquid such that when the frozen liquid is exposed to the predetermined temperature, the at least two gases can combine and be released through the vent hole.

Also provided is a defrost indicator comprising: a body member; an indicia disposed on at least one surface of the body member; and one or more frozen liquids associated with the body member, the one or more frozen liquids being opaque and covering at least a portion of the indicia such that when at least a portion of the one or more frozen liquids melt, the corresponding indicia is visible.

Still further provided is a defrost indicator comprising: an enclosure defining a cavity, the cavity having a hole; an absorbent or reactive material disposed in the hole; and at least one frozen liquid disposed in the cavity, such that defrosting of the at least one frozen liquid wicks into the absorbent material or reacts with the reactive material disposed in the hole to change an appearance of the absorbent or reactive material.

The at least one frozen liquid can comprise two or more layers of frozen liquid, one of the two or more frozen liquids being disposed between the absorbent or reactive material and the other of the two or more frozen materials.

The change in appearance of the absorbent or reactive material can be a change in color. The change in color can indicate defrosting of the at least one frozen liquid and a type of color corresponds to a length of time the at least one frozen material was defrosted. The hole can be an elongated slot having the absorbent or reactive material disposed therein and the change in color indicates defrosting of the at least one frozen liquid and a length of the color in the elongated slot corresponds to a length of time the at least one frozen material was defrosted.

The cavity can have two or more frozen liquids, each corresponding to a different opening or to a different portion of the opening, each of the two or more frozen liquids defrosting at different temperatures so as to absorb into or react with a corresponding absorbent or reactive material.

The defrost indicator can further comprise one or more indicia disposed on a surface of the enclosure corresponding to the hole for indicating one or more of a defrosted state, a subjected temperature and a subjected length of time of defrost.

Still further yet provided is a method for determining whether a frozen product has been defrosted. The method comprising: changing a characteristic of a defrost indicator when the defrost indicator is subjected to a predetermined temperature; and identifying the change in characteristic where the defrost indicator is subjected to the predetermined temperature.

The characteristic can be one or more of a change in appearance of indicia of at least a portion of the defrost indicator, a change in color of at least a portion of the defrost indicator, a change in size or shape of at least a portion of the defrost indicator, a change in height of a color on at least a portion of the defrost indicator, a change in shade of color of at least a portion of the defrost indicator, and a change in smell emanating from the defrost indicator.

BRIEF DESCRIPTION OF THE DRAWINGS

These and other features, aspects, and advantages of the methods apparatus of the present invention will become better understood with regard to the following description, appended claims, and accompanying drawings where:

FIG. 2b illustrates a sectional view of the defrost indicator of FIG. 2a.

FIG. 3b illustrates a sectional view of the defrost indicator of FIG. 3a.

FIG. 5b illustrates a sectional view of the defrost indicator of FIG. 5a.

FIG. 8b illustrates a section view of the defrost indicator of FIG. 8a.

FIG. 9b illustrates a section view of the defrost indicator of FIG. 9a.

DETAILED DESCRIPTION

Although discussed with regard to food, the present defrost indicators can be used with other frozen goods, such as medical supplies.

Figure 1A:
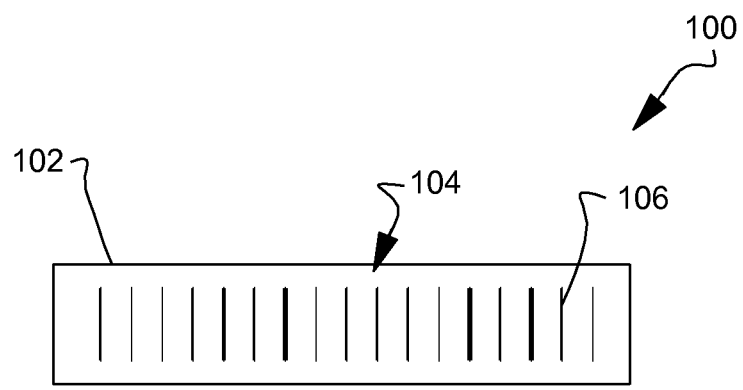
FIG. 1a illustrates a first embodiment of a defrost indicator in a frozen state.
Figure 1B:
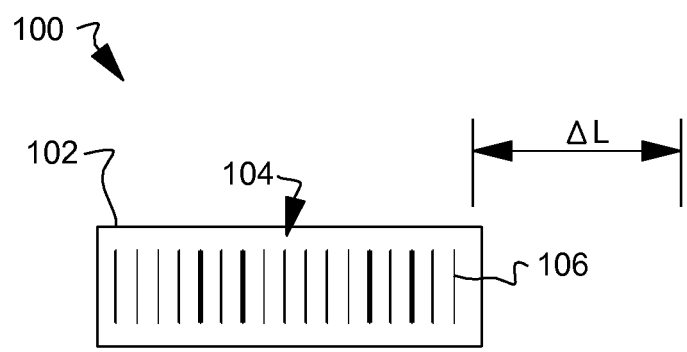
FIG. 1b illustrates the defrost indicator of FIG. 1a in a defrosted state.

Referring first to FIGS. 1a and 1b, a first embodiment of a defrost indicator is illustrated and referred to in general by reference numeral 100. The defrost indicator 100 includes a sheet 102, which can be plastic or water resistant, and can have an elastic portion or be entirely elastic, such that the elastic portion or entirely is capable of stretching on at least one direction. The sheet includes an indicia 104 which has a different appearance when the sheet 102 (or portion thereof) is stretched than when the sheet 102 (or portion thereof) is relaxed (un-stretched).

In FIGS. 1a and 1b, the indicia 104 is a series of spaced lines 106, such as bar codes printed, stitched or otherwise disposed on the sheet 102 (or portion thereof). Thus, one or more of the lines are disposed on the stretchable portion of the sheet 102. The lines 106 can have, among other characteristics, both different thicknesses and different spacing's. Another possibility for a change in indicia (indicating that defrosting has occurred), is a change in pattern, e.g., straight lines has become checker board like.

The sheet 102 (or portion thereof) is then stretched (or the bar code 104 is printed on the stretched fabric), and immersed in water or some other liquid and frozen in the stretched state. The stretched sheet would then have a bar code pattern indicating that the sheet 102 is stretched, and therefore, frozen. The stretched pattern can be scanned with a bar-code scanner to determine if the scanned bar-code corresponds to a frozen state. The frozen and stretched sheet 102, as shown in FIG. 1a, can be placed in a package or frozen food, on the package or on a container of packages. If the temperature of the (food) package in which it is positioned falls below freezing or some predetermined temperature at which the frozen liquid defrosts, the liquid melts, the sheet 102 contracts by a length ΔL, and the bar(s) or their spacing that is positioned on the contracting fabric decreases, thereby changing the bar code pattern, as is shown in FIG. 1b. A bar code scanner can be used to scan the sheet 102 to determine if the package has ever been defrosted (the bar-code corresponds to a defrosted state).

The liquid can be water, which freezes at 32° F. To vary the temperature at which the liquid freezes/defrosts, other liquids can be used or impurities can be added to the water to provide the desired freezing/defrosting temperature. The freezing temperatures of various liquids as well as adding impurities to water to vary its freezing temperature are well known in the art. Some of the liquids and/or impurities can be salt, sugar, alcohol, vinegar, castor oil (freezes at 14° F., which may be good for ice cream, even though ice cream is ideally kept at 0° F., it will not likely to be damaged if kept at a maximum of 14° F.) and propylene glycol (which by itself freezes at −76° F. but can be mixed with water to achieve a desired freezing/defrosting temperature). Of course, if the liquid, when defrosted, is toxic (such as propylene glycol), the defrost indicator can be housed in a sealed container, such as a clear plastic sleeve.

Further, the liquid can encase the sheet 102 or merely be impregnated with it (in the case where the sheet is a fabric or has pores). A sheet that is encased in the frozen liquid may be subjected to a defrosting temperature for a longer period before fully defrosting than a sheet which is merely impregnated with the frozen liquid. Thus, defrost indicators for use with more sensitive foods (cannot stand any prolonged defrosting temperatures) can use sheets in which the liquid defrosts quicker, such as those having an impregnated liquid and vice versa.

Figure 1C:
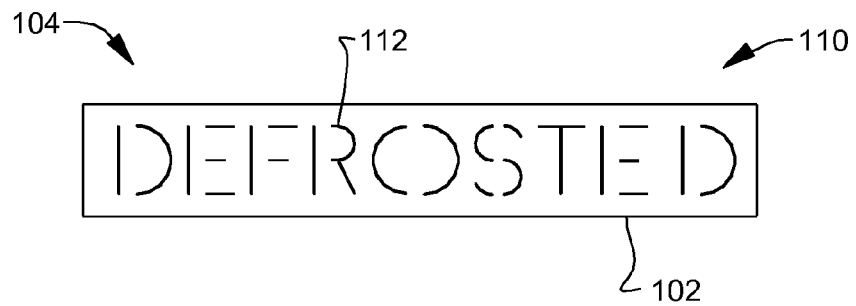
FIG. 1c illustrates a variation of the defrost indicator of FIG. 1a in a frozen state.
Figure 1D:
FIG. 1d illustrates the defrost indicator of FIG. 1c in a defrosted state.

Referring now to FIGS. 1c and 1d, there is shown a variation of the defrost indicator of FIGS. 1a and 1b and generally referred to by reference numeral 110. In the defrost indicator of FIGS. 1c and 1d, the indicia 104 is a grouping of lines 112 (or dots) that when relaxed (un-stretched) forms a word or symbol, such as "DEFROSTED," as shown in FIG. 1d. As can be seen in FIG. 1c, the sheet 102 is stretched and frozen with an appropriate liquid which defrosts at an appropriate temperature depending on the temperature that the food is properly stored and/or transported. When stretched in the form shown in FIG. 1c, the word or symbol is not recognizable.

Figure 1E:
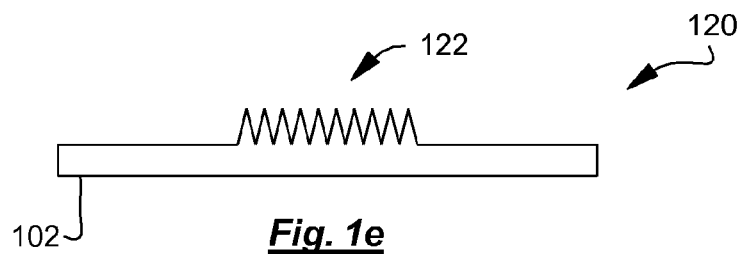
FIG. 1e illustrates another variation of the defrost indicator of FIG. 1a in a frozen state.
Figure 1F:
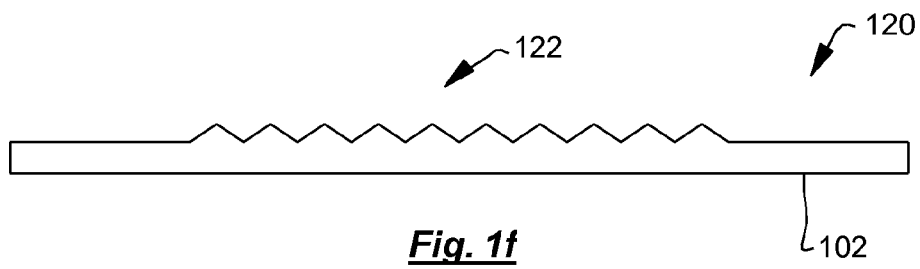
FIG. 1f illustrates the defrost indicator of FIG. 1e in a defrosted state.

Referring now to FIGS. 1e and 1f, there is shown another variation of the first embodiment defrost indicator, generally referred to by reference numeral 120. The top views of the defrost indicator 120 are illustrated in FIGS. 1e and 1f. A face thereof can be as shown, for example, in FIG. 1a, 1b, 1c or 1d. The defrost indicator 120 in FIG. 1e uses a biasing element 122 which can bias the sheet 102 into the stretched state shown in FIG. 1f or the un-stretched state shown in FIG. 1e. The biasing element 122 can be a tension or compression spring, a shape memory element or a bi-metal strip. For example, where the biasing element is a compression spring, the sheet can be stretched into the state shown in FIG. 1f and dipped in an appropriate liquid and locked into the stretched state by freezing the liquid. If the package in which the frozen food is packaged is defrosted, the defrost indicator 122 will likewise defrost and the spring 122 will contract and consequently contract the sheet 102. The biasing element, such as the compression spring can be attached to the sheet 102 by any methods known in the art, such as stitching or adhesive. If the biasing element 122 is a tension spring, it can be compressed and locked in the compressed state by freezing as discussed above. If the package in which the frozen food is packaged is defrosted, the defrost indicator 122 will likewise defrost and the spring 122 will extend and consequently extend the sheet 102. In this case, the difference between the indicia 104 in the stretched state and un-stretched state can be recognized to determine is defrosting occurred.

Where the biasing element 122 is a shape memory element, freezing the sheet is not necessary. Thus, such an embodiment can be used with or without the sheet. With the sheet 102, the shape memory element can either stretch or contract upon experiencing a temperature below its transition temperature (at which the shape memory element undergoes a phase change and changes shape). The transition temperature is chosen to correspond to a defrosting temperature of the food. Thus, the change in the indicia can be recognized to determine if the food has defrosted. Where no sheet 102 is used, a determination of whether the food has defrosted can be based solely on a change in size and/or shape of the shape memory element.

Figure 1G:
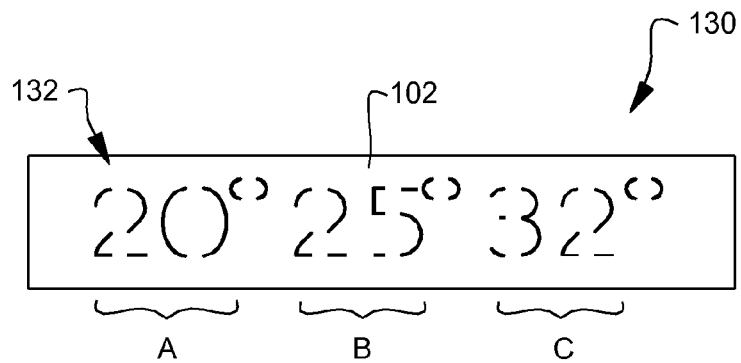
FIG. 1g illustrates another variation of the defrost indicator of FIG. 1a in a frozen state.

Turning now to FIGS. 1g-1j, there is shown another variation of the first embodiment of defrost indicator, generally referred to by reference numeral 130. In the defrost indicator 130 of FIG. 1g, more than one section, such as sections A, B and C can be stretched and locked into the stretched state by using a different liquid for each section and freezing such liquid. For example, a first section A can use a first liquid that defrosts at a first temperature, such as 32° F., a second section B can use a second liquid that defrosts at a second temperature, such as 25° F. and a third section C can use a third liquid that defrosts at a third temperature, such as 20° F. As shown in FIG. 1g, the third temperature can be greater than the second temperature and the second temperature can be greater than the third temperature. In this defrost indicator 130, the first section A is dipped in or other subjected to the first liquid and frozen, then the second section B is dipped in or other subjected to the second liquid and frozen, then the third section C is dipped in or other subjected to the third liquid and frozen.

Figure 1H:
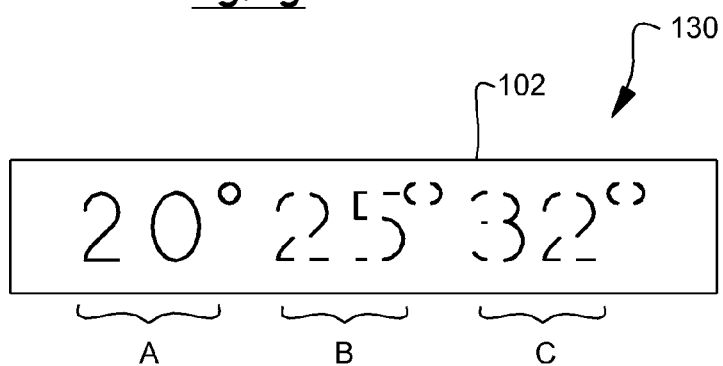
FIGS. 1h-1j illustrate the defrost indicator of FIG. 1g in stages of a defrosted state.
Figure 1I:
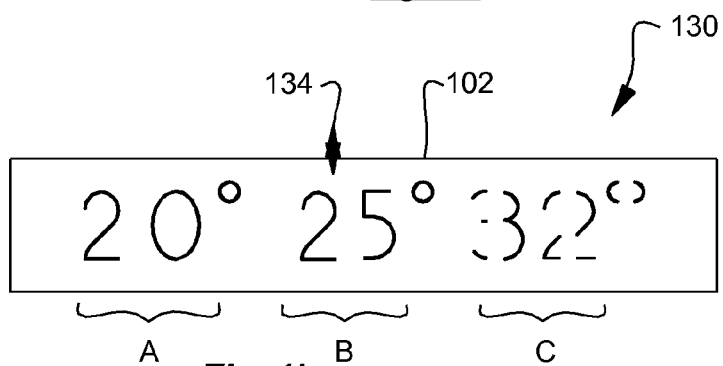
Figure 1J:
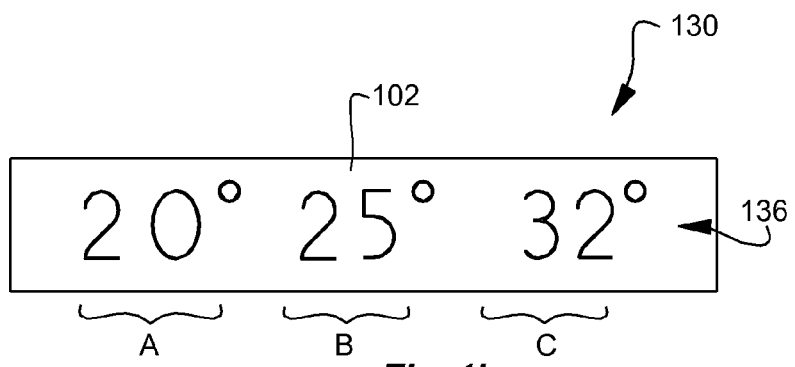

As shown in FIG. 1h, if the defrost indicator 130 is subjected to a temperature over the third temperature, an indicia 132 on the third section C will change indicating that the package/food was subjected to a temperature over the third temperature (e.g., 20° F.). However, as long as the temperature does not rise above the second temperature, the indicia on the other sections A, B will not change, indicating that the food/package was not subjected to temperatures above the first and second temperatures. The indicia can be a shape(s), line(s) or lettering. In the embodiment of FIGS. 1g-1j, lettering which indicates the first, second and third temperatures when defrosted is used. As shown in FIG. 1i, if the defrost indicator 130 is subjected to a temperature over the second temperature, an indicia 134 on the second section B will change indicating that the package/food was subjected to a temperature over the second temperature (e.g., 25° F.). However, as long as the temperature does not rise above the first temperature, the indicia on section A will not change, indicating that the food/package was not subjected to a temperature above the first temperature. As shown in FIG. 1j, if the defrost indicator 130 is subjected to a temperature over the first temperature, an indicia 136 on the first section A will change indicating that the package/food was subjected to a temperature over the first temperature (e.g., 32° F.). As few or as many sections can be used, particularly, where it is useful to know the maximum temperature that the product is subjected to. For example, some foods may not be spoiled above certain temperatures, but its quality can be compromised if it is subjected to temperatures over a certain temperature, even if it remains frozen.

Figure 2A:
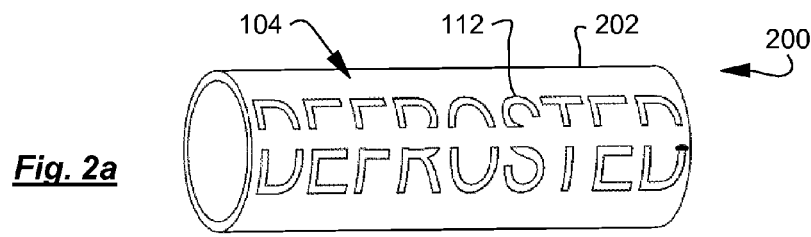
FIG. 2a illustrates a second embodiment of a defrost indicator in a frozen state.
Figure 2B:
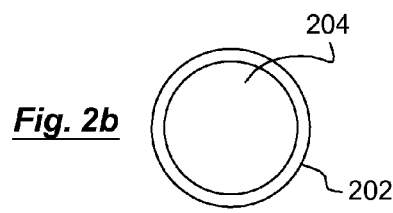
Figure 2C:
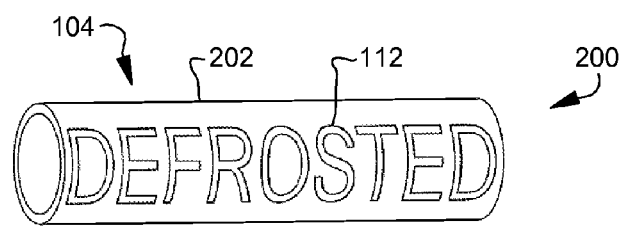
FIG. 2c illustrates the defrost indicator of FIG. 2a in a defrosted state.
Figure 2D:
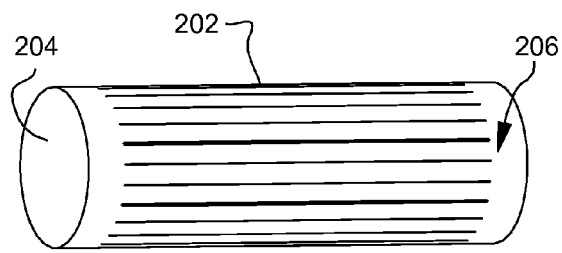
FIG. 2d illustrates a variation of the defrost indicator of FIG. 2a in a frozen state.
Figure 2E:
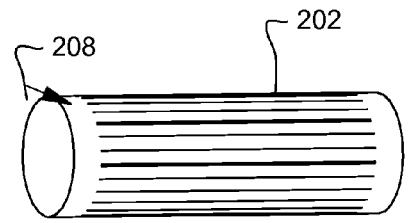
FIG. 2e illustrates the defrost indicator of FIG. 2d in a defrosted state.

Referring now to FIGS. 2a and 2b, there is shown a second embodiment of a defrost indicator, generally referred to by reference numeral 200. In the embodiment of FIGS. 1a and 1b, the frozen liquid (e.g., ice) that keeps the stretchable portion(s) in a stretched state is positioned around (and/or over and/or through) the material (e.g., fabric) of the sheet 102. In the defrost indicator 200 of FIG. 2a, the sheet is formed of an elastic tube 202 (which can be partially or entirely elastic) and then filled with a desired frozen liquid 204 which is shaped to keep the section in a stretched state, as shown in FIG. 2b. As shown in FIG. 2a, the indicia 104 can be a series of lines 112. As shown in FIG. 2c, the series of lines 112 can be such that when the tube contracts (the liquid 204 defrosts), are recognized as corresponding to the defrosted state. Such series of lines can make letters when the tube 202 contracts, such as "DEFROSTED" as shown in FIG. 2c. The advantages of this embodiment includes: (a) it is easier to hold the section in its stretched state since the frozen solid cannot be separated from (break away or fall of) the stretchable material; (b) the stretchable material protects the frozen solid from melting too quickly, therefore can be used to provide a delay time; and (c) it is significantly easier to fabricate, i.e., make and then push the solid in to stretch and hold in that state, and also have time to package the food stuff with the defrost indicator. As shown in the variation of FIGS. 2d and 2e, the series of lines can be a bar code 206 that corresponds to a frozen state when the tube 202 is stretched, as shown in FIG. 2d, and a bar code 208 that corresponds to a defrosted state when the liquid 204 defrosts and the tube 202 contracts, as shown in FIG. 2e.

Figure 3A:
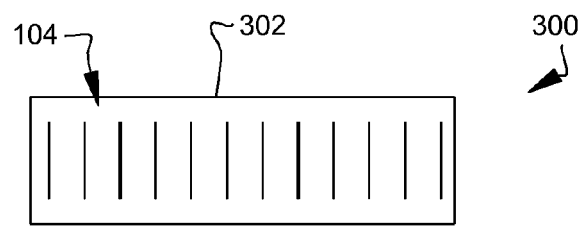
FIG. 3a illustrates a third embodiment of a defrost indicator in a frozen state.
Figure 3B:
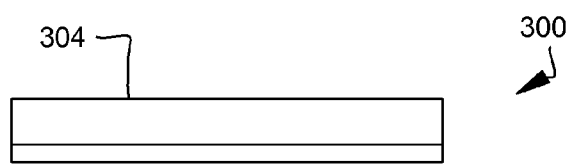
Figure 3C:
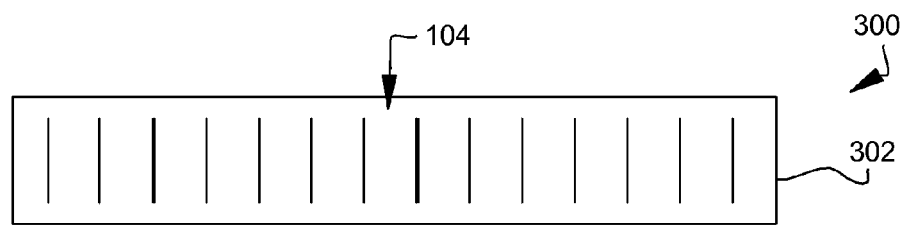
FIG. 3c illustrates the defrost indicator of FIG. 3a in a defrosted state.
Figure 3D:
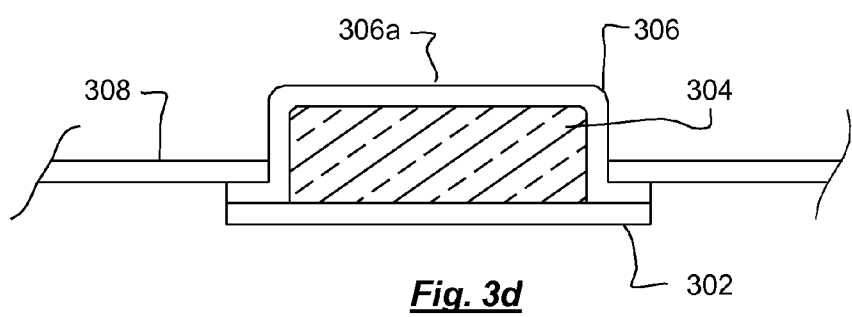
FIG. 3d illustrates a sectional view of a variation of the defrost indicator of FIG. 3a in a frozen state.

Referring now to FIGS. 3a-3c, there is shown a third embodiment of a defrost indicator, generally referred to by reference numeral 300. In the defrost indicator 300 if FIGS. 3a-3c, an indicia 104, such as a bar code is printed or otherwise disposed on a material 302, at least a portion of which is capable of expanding once it absorbs liquid 304, such as water. The liquid 304 is frozen and then attached to the material 302, as shown in FIG. 3b. If the defrost indicator or food package temperature falls below a predetermined temperature, such as freezing, the frozen liquid 304 melts and is absorbed by the material 302, thereby expanding it. The bar code pattern is thereby changed, as shown in FIG. 3c and a scanner can tell if the food package has defrosted. One advantage of this embodiment is that the defrost indicator 300 can be made to take relatively long time to be activated following melting (so that if one spot over the defrost activator 300—on the surface of the food package is heated—e.g., exposed to sun, then the defrost indicator is not quickly activated/defrosted). Materials 302 that expand upon absorbing liquids are well known in the art, such as compressed sponge sheeting. Referring now to FIG. 3d, a variation of the defrost indicator 300 is shown in which the frozen liquid 304 is encased in an enclosure 306 and sealed to the material 302. An adhesive can be applied to surface 306a for adhering the enclosure 306 to a package. Alternatively, the enclosure can be fabricated integrally with a portion of the package 308.

Figure 4A:
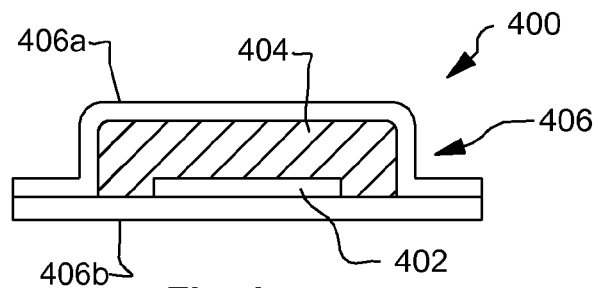
FIG. 4a illustrates a sectional view of a fourth embodiment of a defrost indicator in a frozen state.
Figure 4B:
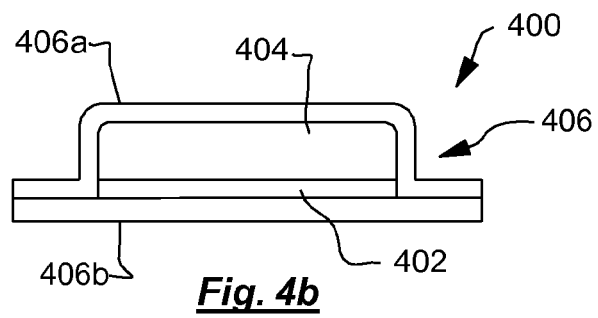
FIG. 4b illustrates a sectional view of the defrost indicator of FIG. 4a in a defrosted state.

Referring now to FIGS. 4a and 4b, there is shown a fourth embodiment of a defrost indicator, generally referred to by reference numeral 400. In the embodiment of FIGS. 4a and 4b, a material 402, which can either contract when defrosted (as discussed above) or expand upon absorbing a liquid (as also discussed above) is disposed in an enclosure 406. In the configuration illustrated in FIGS. 4a and 4b, the material 402 is of the latter type and is shown expanded in FIG. 4b due to defrosting of the liquid 404 in the enclosure 406 and expanding as a result of absorption of such liquid 404. The back 406a of the enclosure 406 can be a plastic film or an aluminum foil that would reach the temperature of the packaged food quickly and would not easily warm up to the temperature of the surrounding environment during handling of the package. The enclosure 406 can be a sealed water-tight package with a front side 406b being transparent so that any indicia on the material 402, such as a bar-code, can be visible from outside for scanning. Thus, a bar code indicative of a frozen state, such as in FIG. 4a can be distinguished from a bar-code indicative of a defrosted state, as shown in FIG. 4b. As discussed above with regard to the embodiment of FIG. 3d, the enclosure can be attached or an integral part of the food package/container.

Figure 5A:
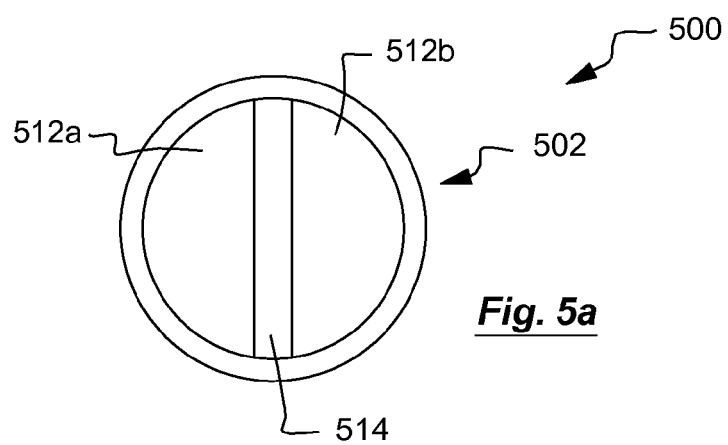
FIG. 5a illustrates a fifth embodiment of a defrost indicator in a frozen state.
Figure 5B:
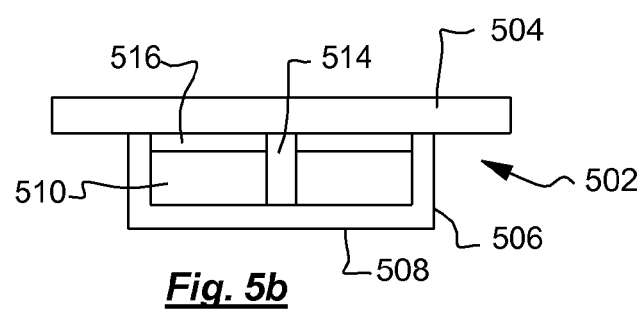
Figure 5C:
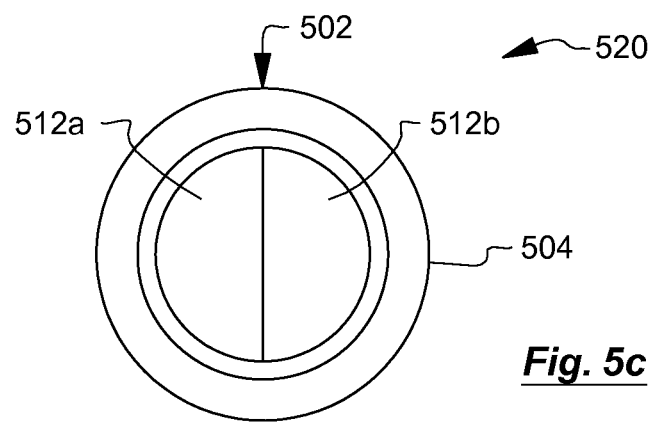
FIG. 5c illustrates a variation of the fifth embodiment of a defrost indicator in a frozen state.
Figure 5D:
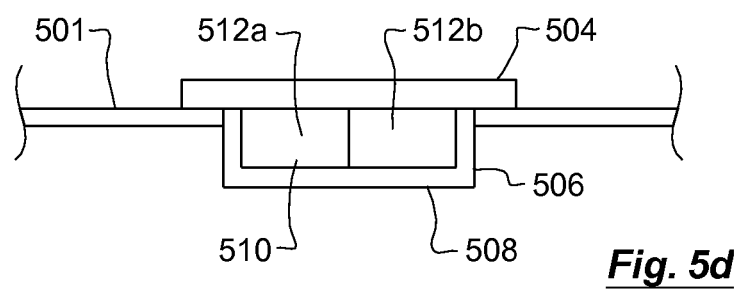
FIG. 5d illustrates a sectional view of the defrost indicator of FIG. 5c.

Referring now to FIGS. 5a-5d, there is illustrated a fifth embodiment of a defrost indicator, generally referred to by reference numeral 500. The defrost indicator 500 includes an enclosure 502 which can include a back 504, one or more sides 506 and a front 508 defining an interior cavity 510. The front 508 can have at least a portion thereof that is transparent for viewing the interior cavity 510. The enclosure can be of any shape or size and can be adhered or otherwise fixed to a package, such as by applying an adhesive to the back 504, can be loosely provided in the package or be integrally formed with a wall 501 of the package in which the frozen food is stored. As shown in FIGS. 5a and 5b, the interior cavity 510 can have two chemicals, or two of the same fluids that are differently colored that either react or mix to change to a third color, each of which are generally referred to by reference numerals 512a and 512b. Alternatively, the two liquids can defrost and change to one solid color (as opposed to two different colors (e.g., clear and red) when frozen). One or both of the chemical/liquids can be frozen or the chemical/liquids can be separated by a frozen (separation) barrier 514. Once the frozen barrier 514 (or one or both of the frozen liquids) has melted, it allows the separated chemicals to react or liquids to mix, thereby changing their color, indicating that the food has defrosted. An absorbing material 516 may be provided in the interior cavity 510 to facilitate the mixing. Alternatively, the two chemicals/liquids may be on either side of an absorbing paper 516 or the like, such that when the melting point is reached, one or both chemicals/liquids melt and are absorbed by the absorbing paper, thereby mixing to change color. It should be appreciated that one of the chemicals may be in the absorbing paper 516. As shown in FIGS. 5c and 5d, the defrost indicator 520 can include both of the two chemicals/ liquids 512a, 512b being frozen without the need of the frozen barrier 514.

Figure 5E:
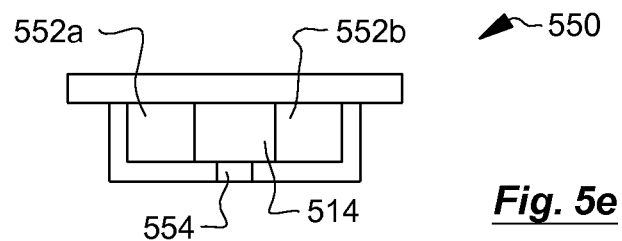
FIG. 5e illustrates another variation of the fifth embodiment of a defrost indicator in a frozen state.
Figure 5F:
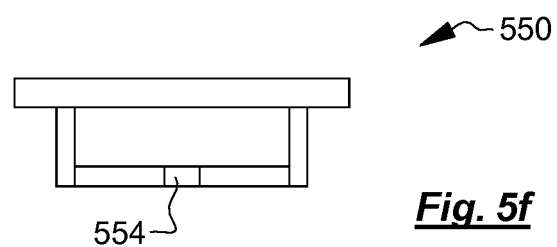
FIG. 5f illustrates a sectional view of the defrost indicator of FIG. 5e.

Referring now to FIGS. 5e and 5f, there is shown a variation of the fifth embodiment, referred to generally by reference numeral 550. In the defrost indicator 550, the frozen separation layer 514 can also separate two gases 552a, 552b that when combined produce a chemical reaction, such as a color change or a smell (such as a foul smelling odor alerting the user to the fact that the food was subject to defrosted conditions). In this regard, the frozen barrier 514 can block a hole 554 in the front 508 when frozen, as shown in FIG. 5e and allow gas to escape (so that the odor can be smelled by the user) when the frozen barrier 514 is defrosted, as shown in FIG. 5f.

Figure 6A:
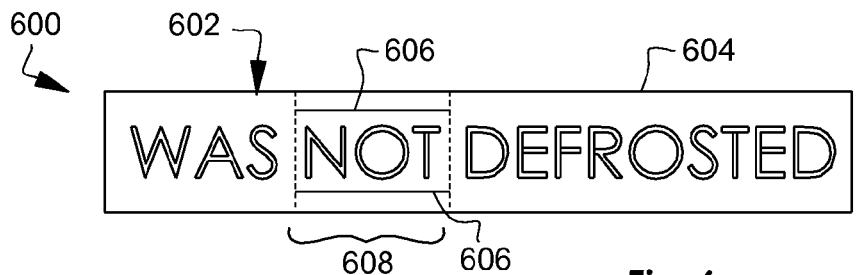
FIG. 6a illustrates a sixth embodiment of a defrost indicator in a frozen state.
Figure 6B:
FIG. 6b illustrates the defrost indicator of FIG. 6a in a defrosted state.
Figure 6C:
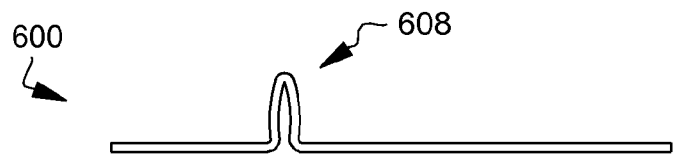
FIG. 6c illustrates a top view of the defrost indicator of FIG. 6b in the defrosted state.

Referring now to FIGS. 6a-6c, there is shown a sixth embodiment of a defrost indicator, generally referred to by reference numeral 600. In the defrost indicator 600, the indicia 602 is writing (alpha-numeric characters) and the writing changes to indicate that the defrost indicator 600 was subjected to a defrosting condition. For example, the writing can change from "GOOD" to "BAD" or "WAS NOT DEFROSTED" to "WAS DEFROSTED." The defrost indicator 600 of FIGS. 6a-6c include a material 604, such as a fabric or film, having the indicia 602 disposed thereon, such as by printing or stitching. In the example of FIGS. 6a-6c, the indicia 602 is "WAS NOT DEFROSTED." The material includes one or more elastic elements 606 that are biased to close a portion 608 of the material 604, as shown in FIGS. 6b and 6c. The portion corresponds to a selected portion of the writing 602. In the example of FIGS. 6a-6c, the portion 608 corresponds to the word "NOT" such that in the configuration of FIG. 6a, the wiring reads "WAS NOT DEFROSTED" and in the configuration of FIGS. 6b and 6c, the writing reads "WAS DEFROSTED" since "NOT" is blocked out by the material 606 folding upon itself corresponding to the word "NOT" due to the biasing of the elastic elements 606. The elastic elements 606 are stretched into the configuration shown in FIG. 6a and frozen in the stretched state with a liquid which freezes at an appropriate temperature for the particular use of the defrost indicator 600. Thus, as long as the liquid remains frozen, the writing will read "WAS NOT DEFROSTED." However, if the liquid that keeps the elastic elements 606 frozen (and thereby extended) defrosts, the elastic elements bias the material 604 into the configuration shown in FIGS. 6b and 6c and the writing changes to "WAS DEFROSTED" to indicate that the food was subjected to a defrosted condition. Although described with regard to elastic elements, the material 604 itself can be elastic at least in the portion 608 and frozen in the stretched state shown in FIG. 6a. In this case, the word "NOT" can "shrink out" when the liquid in/on the material 604 defrosts. Of course, the defrost indicator can also be configured to expose an additional word when defrosted, for example, by using elastic elements biased outwards and locking (freezing) the same in a compressed state, which will extend when defrosted to expose a word/phrase/ symbol etc.

Figure 7A:
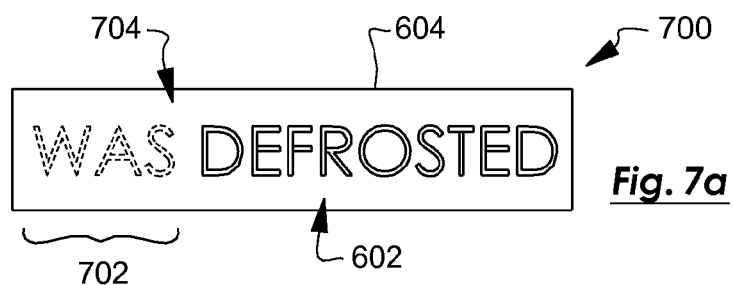
FIG. 7a illustrates a seventh embodiment of a defrost indicator in a frozen state.
Figure 7B:
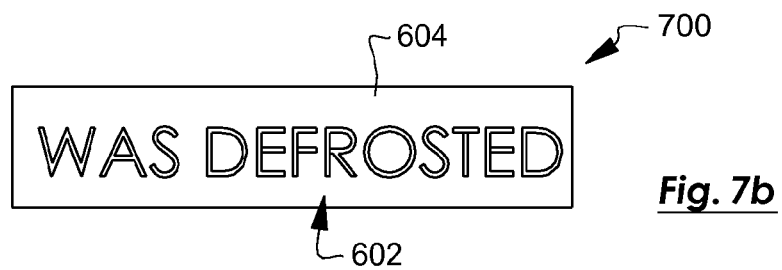
FIG. 7b illustrates the defrost indicator of FIG. 7a in a defrosted state.

Referring now to FIGS. 7a and 7b, the defrost indicator, generally referred to by reference numeral 700, can also effect the change in indicia, such as writing 602, by using a frozen opaque layer cover all or at least a portion 702 of the writing 602. For example, the writing 602 can be the words "WAS DEFROSTED" with the word "WAS" corresponding to the portion 702 having the frozen opaque liquid 704, as shown in FIG. 7a. Therefore, when defrosted, the frozen opaque liquid 704 melts to make the writing "WAS DEFROSTED" visible, as shown in FIG. 7b.

Figure 8A:
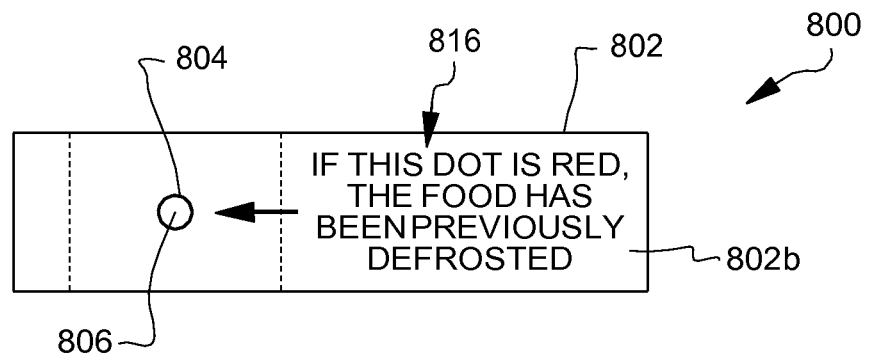
FIG. 8a illustrates an eighth embodiment of a defrost indicator in a frozen state.
Figure 8B:
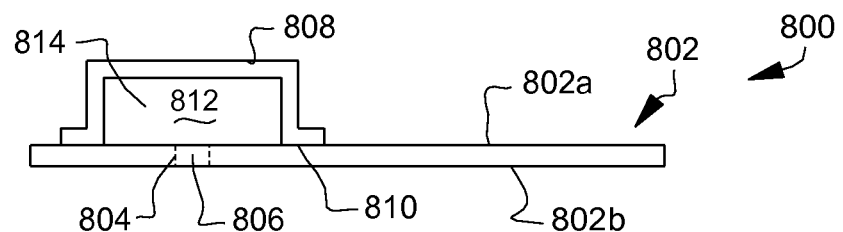
Figure 8C:
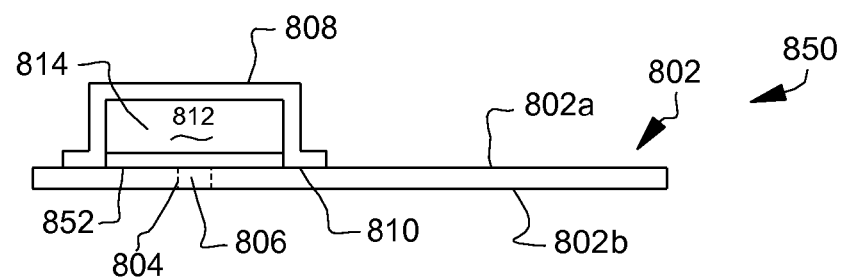
FIG. 8c illustrates a sectional view of a variation of the defrost indicator of FIG. 8b.

Referring now to FIGS. 8a and 8b, there is shown an eighth embodiment of a defrost indicator, generally referred to by reference numeral 800. The defrost indicator 800 includes a sheet member 802 having a window 804. The window 804 can have an absorbent material 806, such as cotton or paper. An enclosure 808 is disposed on a back side 802a of the sheet member 802, such as by adhering a flange 810 of the enclosure 808 to the back side 802a, such that a cavity 812 formed by the enclosure 808 and the back side 802a is in communication with the window 804. The cavity holds a colored liquid 814, such as dyed water that is frozen in the cavity. If the colored liquid 814 defrosts, the same wicks into the absorbent material 806 in the window 804 and changes the color of the absorbent material 806. Alternatively, the change of color in the absorbent material can be due to a chemical reaction between the liquid in the cavity 812 and a chemical on the absorbent material 806. A front side 802b of the sheet member 802 can have an indicia 816, such as a writing alerting the user of a previously defrosted condition if the absorbent material 806 in the window 804 changes color (e.g., "if this dot is red, the food has been previously defrosted"). The indicia can also include a color "key" which allows the user to compare the shade of the color and equate such shade with a time period that the liquid 814 was defrosted (e.g., 30 minutes of defrosting will make the dot a darker shade of red than 10 minutes of defrost). The absorbent material (or more than one material) can be chosen to facilitate the change in shade over time). FIG. 8c illustrates a variation of the defrost indicator of FIGS. 8a and 8b, generally referred to by reference numeral 850. In the defrost indicator of FIG. 8c, a layer of a second frozen liquid 852 is added between the absorbent material 806 and the frozen colored liquid 814 (or reactive chemical). The second frozen liquid 852 can have no coloring (or reactive chemical) such that the absorbent material 806 does not change color even where the frozen colored liquid (or reactive chemical) remains frozen (e.g., to prevent the absorbent material 806 from absorbing dye from the frozen colored liquid 814 by virtue of their contact with each other).

Figure 9A:
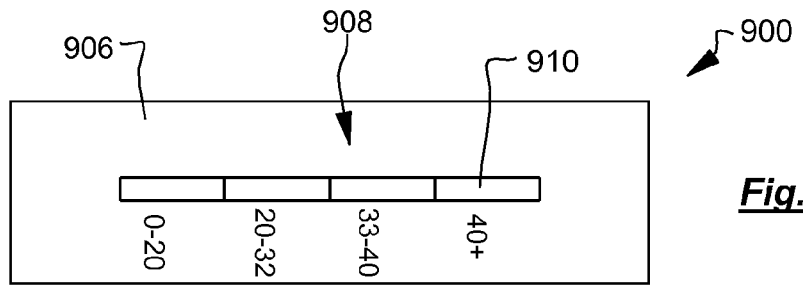
FIG. 9a illustrates an ninth embodiment of a defrost indicator in a frozen state.
Figure 9B:
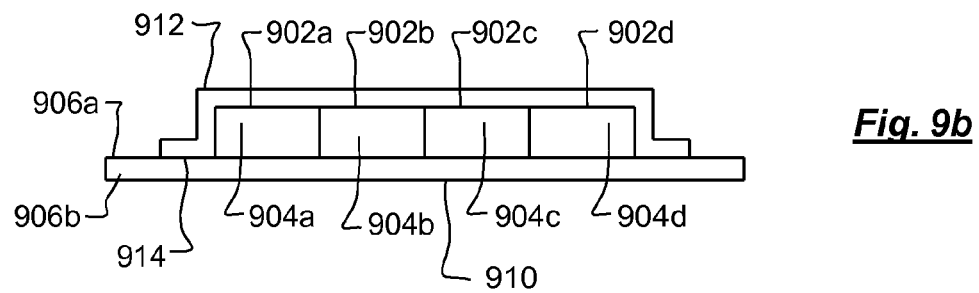

Referring now to FIGS. 9a and 9b, there is shown another embodiment of a defrost indicator, generally referred to by reference numeral 900. The indicator 900 is similar to that of indicator 800, except that two or more cavities 902a-d (or portions of a single cavity 902) are provided, each having a colored liquid 904a-d associated therewith that freezes/defrosts at a different temperature. As with the indicator 800, the defrost indicator 900 includes a sheet member 906 having a window 908. The window 908 can have an absorbent material 910, such as cotton or paper. An enclosure 912 is disposed on a back side 906a of the sheet member 906, such as by adhering a flange 914 of the enclosure 912 to the back side 906a, such that the cavity 902 or cavities 902a-d are formed by the enclosure 912 and the back side 906a and the cavity 902 or cavities 902a-d are in communication with the window 908. The cavity 902 or cavities 902a-d each hold a colored liquid, such as dyed water that is frozen in the cavity. If the colored liquids 904a-d defrost, the same wick into the corresponding absorbent material 910 in the window 908 and changes the color of the absorbent material 910. Alternatively, the change of color in the absorbent material can be due to a chemical reaction between the liquid in the cavity and a chemical on the absorbent material. A front side 906b of the sheet member 802 can have indicia, such as writing indicating the temperature corresponding to the defrost temperature of the associated colored liquid. That is, the colored liquid 904a in cavity 902a can defrost at a temperature in the range of 0-20 degrees Fahrenheit, the colored liquid 904b in cavity 902b can defrost at a temperature in the range of 20-32 degrees Fahrenheit, the colored liquid 904c in cavity 902c can defrost at a temperature in the range of 33-40 degrees Fahrenheit and the colored liquid 904d in cavity 902d can defrost at a temperature greater than 40 degrees Fahrenheit. In this way, the user can visually determine the highest temperature range that the indicator (and package associated therewith) was subjected to. The colored liquids 904a-d can be all colored the same or have different colors.

Also, the indicia can also include a color "key" for each portion which allows the user to compare the shade of the color and equate such shade with a time period that the liquid was defrosted (e.g., 30 minutes of defrosting will make the absorbent material 910 a darker shade of red than 10 minutes of defrost). As discussed above with regard to FIG. 8c, a layer of a second frozen liquid can be added between the absorbent material and the frozen colored liquid (or reactive chemical). The second frozen liquid can have no coloring (or reactive chemical) such that the absorbent material does not change color even where the frozen colored liquid (or reactive chemical) remains frozen (e.g., to prevent the absorbent material from absorbing dye from the frozen colored liquid by virtue of their contact with each other).

Figure 9C:
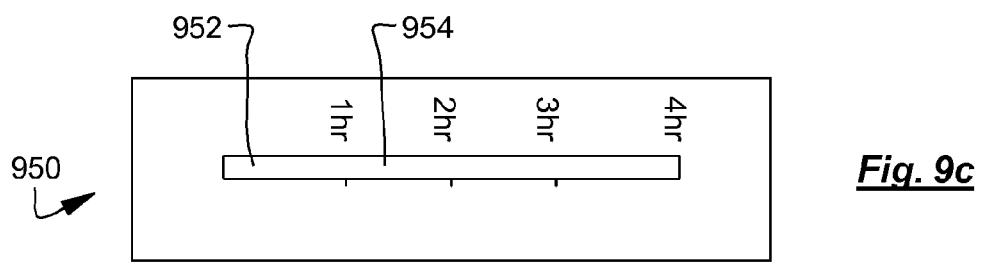
FIG. 9c illustrates a variation of the defrost indicator of FIG. 9a in a frozen state.
Figure 9D:
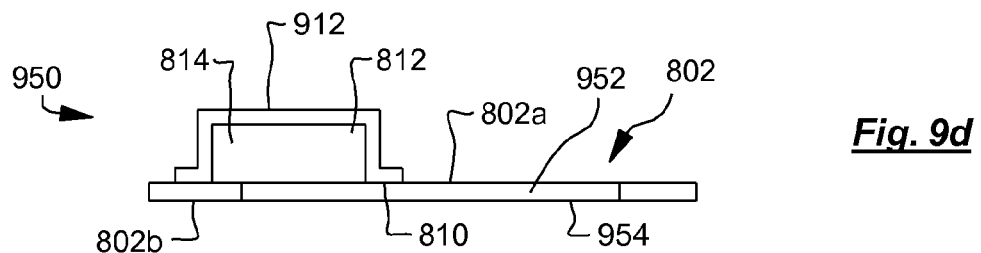
FIG. 9d illustrates a section view of the defrost indicator of FIG. 9c.

Referring now to FIGS. 9b and 9c, there is shown another embodiment of a defrost indicator, generally referred to by reference numeral 950. The embodiment of 9c and 9d provides time based diffusion through one or more stages so that, not only can a user know that the indicator (and package used therewith) was defrosted, but also how long the defrost state remained before re-freezing (if at all). The indicator 950 is similar to the indicator of FIGS. 8a-8c (with similar reference numerals indicating similar features), except the absorbent material 952 is disposed in an elongated slot 954 with an end of the absorbent material being in communication with the cavity 812. As the frozen colored liquid 814 defrosts, the same will wick into the absorbent material 952. The height at which the colored liquid wicks can be associated with a time in which the indicator remains subjected to defrosting temperatures. Indicia on the front surface 802b of the member 802 can be placed at several heights associated with a corresponding time. That is, the indicia can be "1 hour," "2 hours," "3 hours" and "4 hours." Thus, the user can visually inspect the indicator and determine that the associated package was subjected to a defrost condition and an approximate time period that the associated package remained in the defrost condition.

In the above, the freezing temperature may be that of water or any other temperature at which the packaging liquid is designed to melt.

The bar code format discussed above may be used in any of the aforementioned embodiments. In such bar code configurations, the effect of defrosting can be either bar code width change (narrower or wider), and/or spacing change (narrower or wider). On the other hand, the indicators may be designed with bars or other shapes such that following defrosting, the pattern is changed. Some simple shapes include circles or other geometrical shapes, particularly those that by relatively small change in size or spacing, the scanning pattern is changed significantly.

It is appreciated that more than one liquid, each melting at a different temperature may be used in each sensor. As a result, more than one section can be filled with liquids with different melting points, each for making a prescribed change in the scanned pattern through a change in width of a bar of a bar code, and/or its spacing, and/or the shape or size of a marking that is used to indicate the defrosting history of the package. As a result, a range of temperature that the package has reached earlier can be detected.

Furthermore, a shape memory alloy strip, wire or the like may be used to change the bar code wide and/or spacing to present scanning pattern change or the change in shape, etc., in order to indicate that defrosting event has occurred. It is noted that when using shape memory alloy elements, the shape scanned pattern change should not be reversible so that if the food package is frozen again following defrosting, the pattern to be scanned does not return to its pre-defrosting state (e.g., the spring element 122 in FIG. 1e and if can be spring or SMA material—if spring can expand fabric, if SMA, can expand or contract upon defrost over a transition temp).

Sensors, such as RF tags can be used to determine upper or lower temperature reached (one point low or high limit or a range for high and/or low).

Other devices, some based on shape memory alloys or bimetals, can also be used to act as a "switch", e.g., for actuating certain devices when certain temperature level is reached.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A defrost indicator comprising:
   a body member defining a cavity;
   two or more fluids, each having one or more of a different composition or characteristic; and
   wherein when the two or more fluids are exposed to a predetermined temperature, the two or more fluids mix or interact to produce a different composition or characteristic; and
   the two or more fluids are at least one frozen liquid separating at least two gases.

2. The defrost indicator of claim 1, wherein the body member further comprises a vent hole corresponding to the frozen liquid such that when the frozen liquid is exposed to the predetermined temperature, the at least two gases can combine and be released through the vent hole.

* * * * *